Sept. 30, 1969 R. B. GREKILA ET AL 3,469,729
SEALING COMPOSITIONS FOR BONDING CERAMICS TO METALS
Filed June 30, 1966
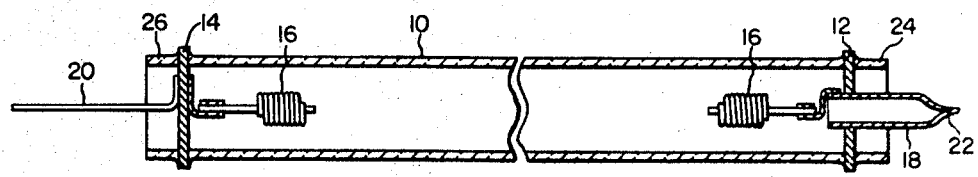
FIG.1.
FIG.2.
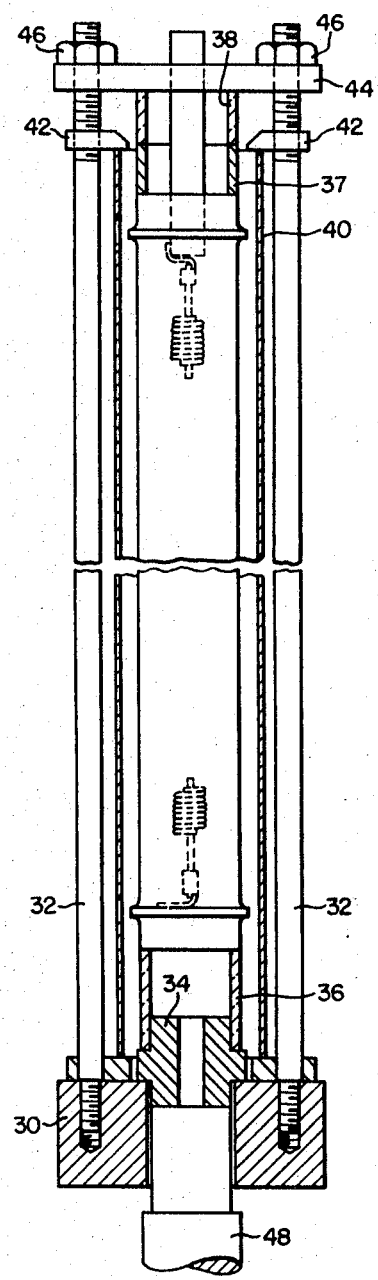
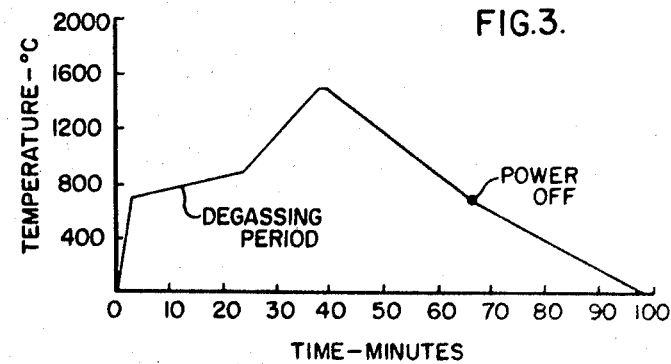
FIG.3.
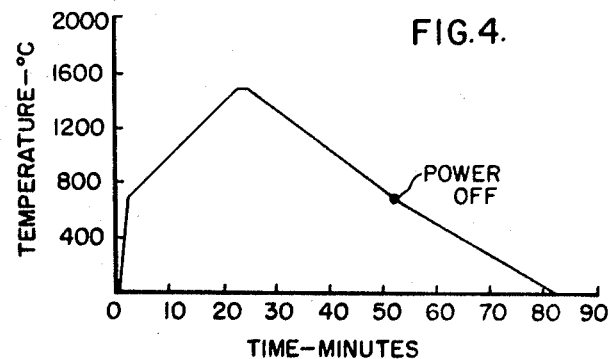
FIG.4.
INVENTORS
Richard B. Grekila, Shih-Ming Ho,
William J. Knochel and Francis C.M. Lin
BY
Blair R. Studebaker
ATTORNEY

United States Patent Office 3,469,729
Patented Sept. 30, 1969

3,469,729
SEALING COMPOSITIONS FOR BONDING
CERAMICS TO METALS
Richard B. Grekila and Shih-Ming Ho, Pittsburgh, Pa.,
William J. Knochel, West Orange, N.J., and Francis C.
M. Lin, New York, N.Y., assignors to Westinghouse
Electric Corporation, Pittsburgh, Pa., a corporation of
Pennsylvania
Filed June 30, 1966, Ser. No. 562,016
Int. Cl. H01k 1/42; C04b 37/00, 39/00
U.S. Cl. 220—2.3     10 Claims This invention relates to sealing compositions for sealing ceramics to ceramics and ceramics to metals and more particularly to a sealing composition and method of producing same for sealing ceramic or refractory metal closure members to the ceramic discharge tube of high temperature metal vapor lamps.

Numerous compositions have been employed in an effort to seal ceramic bodies, particularly ceramic bodies of high alumina content, to refractory metals. Principally these efforts have been directed to the sealing of either ceramic or metal end discs or caps to ceramic lamp bodies composed of sintered high density polycrystalline alumina in concentrations of the order of 99.5%. These sealing compositions, in addition to providing a good bond, must also withstand the high temperatures and alkali metal vapors employed in the discharge of such lamps. Attempts have been made to seal such lamps utilizing alloys of titanium-nickel composition, as a metallic bond, and glassy compositions, containing for example aluminum oxide and one or more of calcium oxide, barium oxide and strontium oxide at nearly eutectic percentages. Metallic bonds do not, however, prove suitable for higher temperature stresses in the range of 1500° C., while the glassy sealing compositions tend to recrystallize at higher temperatures producing cracks, and additionally, reactions between the alkali metal vapors of the lamps and the glassy sealing material cause, in some instances, early failure of the lamps.

The foregoing difficulties with respect to known methods are substantially eliminated to a large extent in lamps sealed with compositions envisioned by the present invention. Basically, the raw or batch compositions of the present invention consist essentially of pure calcium carbonate and pure alumina both in very fine powder form and in molar proportions of 2:1, in addition to selective additives which essentially act as modifying agents in producing consistent high temperature, vacuum tight bonds or seals between polycrystalline alumina lamp bodies and ceramic or metallic end closure members. These end closure members are generally high alumina content ceramics or refractory metals such as tantalum or niobium. Others of the additives tend to improve the thermal properties of the near eutectic calcium oxide-alumina compositions as well as the mechanical strength of the bonds. Of additional importance in producing sound vacuum tight seals with the compositions of the present invention are the firing tempreatures and time periods employed during the process of sealing high temperature ceramic discharge tubes. The sealing processes involve generally the heating of a discharge tube structure having the sealing compositions applied thereto in a vacuum furnace from room temperature at a predetermined rate until a temperature of between about 1425° C. and 1550° C. is reached, holding the assembly at that temperature for approximately one minute, then reducing the temperature at a predetermined rate to about 700° C. and then permitting the assembly to cool, with the furnace shut down, to room temperature.

An object of this invention is to provide a sealing composition to effectively seal ceramic members to ceramic members or to refractory metal members in a high temperature metal vapor lamp.

Another object is to provide a sealing composition which will effectively retain a vacuum tight bond between ceramic material and metallic material at temperatures up to 1200° C.

A further object of the present invention is to provide a sealing technique for producing a seal which is both thermally and mechanically sound at extremely high temperatures.

These and other objects as well as many of the attendant advantages of the present invention will become more clearly understood as the following detailed description is considered in connection with the accompanying drawings, in which:

FIGURE 1 is a sectional view of a high temperature metal vapor discharge tube illustrative of one possible use of the sealing compositions of the present invention;

FIG. 2 illustrates a fixture for use in sealing ceramic body members to metal end plates in a vacuum furnace;

FIG. 3 is a firing schedule diagram illustrative of one method of producing ceramic to metal seals in accordance with the present invention; and FIG. 4 is a firing schedule diagram of another method of producing ceramic to metal seals in accordance with the present invention.

One of the principal uses for which the sealing compositions of the present invention have been highly successful is the sealing of end discs or caps to high temperature metal vapor discharge tubes of the type shown in FIG. 1. The discharge tube illustrated in FIG. 1 generally comprises a body member 10 of high-density, sintered, polycrystalline alumina which has sealed thereto and is sealed off at each end by tantalum or niobium discs or caps 12 and 14 preferably of a thickness from about 0.004 to 0.015 inch. Of course these end discs or caps may be equally as well constructed from a ceramic material such as, for example, a ceramic having a high alumina content. Each of the discs or caps 12 and 14 have secured to the inner surfaces coiled tungsten electrodes 16 and on the exterior surfaces lead-in conductor members 18 and 20 respectively. Lead-in conductor 18 is in the form of a tantalum tube which extends through end disc 12 to provide for the evacuation of the interior of the discharge tube and the insertion into the lamp of the discharge sustaining filling. After evacuation and charging of the discharge tube the tubular lead-in conductor 18 is tipped off by means of squeezing and welding at 22. Short polycrystalline alumina backup rings 24 and 26 are also sealed to the outer surfaces of tantalum or niobium end discs 12 and 14 respectively. When cup-shaped caps are employed instead of the end discs illustrated, the alumina backup rings are unnecessary.

When the tube of FIG. 1 is sealed off, the mating surfaces between discharge tube 10, end discs 12 and 14, and backup rings 24 and 26 are coated with a paste-like form of the compositions of the present invention and held together during the novel firing schedules shown in FIGS. 3 and 4 by means of a molybdenum fixture of the type shown in FIG. 2.

In order to obtain a vacuum tight seal, the sealing material must wet both the ceramic body and the metal disc or cap. At the same time, the thermal expansion of the three different materials (i.e., the ceramic discharge tube body, the metallic end disc or end cap and the sealing composition) should closely match each other to avoid failure as a result of thermal stresses. Furthermore, the seal must be chemically inert to metal vapors and have sufficient bond strength.

As an example, the batch composition from which the various alternative embodiments are derived consists essentially of one mole of pure calcium carbonate and ½ mole of pure alumina, both in very fine powder form. To this batch mixture is added a selected minor percentage of one or more of the modifying oxides later to be described. The constituents are well mixed and then suspended in an organic vehicle, for example amyl acetate. Several drops of a viscosity imparting agent such as an organic cement, for example, cellulose acetate, are added in order to increase the green strength of the composition and the mixture is stirred until a paste-like consistency is reached. The batch composition is then placed on the tantalum tube 18 at its point of contact with the center hole in a tantalum or niobium disc 12 and on the mating areas of backup ring 26, disc 14, arc tube 10, disc 12 and backup ring 24 and the assembly fired as will later be described to produce a high temperature vacuum seal between the associated parts. As is well known to those skilled in the art, the composition may be applied to the respective surfaces by means of brushing, spraying or by use of compacted preforms.

Sealing compositions of improved mechanical bonding and better fluxing action are produced by modifying a basic batch mixture of $CaCO_3$ and $Al_2O_3$ in a percentage by weight ratio of approxvimately 2:1 by adding from ½ to 10% by weight of one or more materials taken from the group consisting of $SiO_2$, $BaO$, $ZrO_2$, $SrO$, $TiO_2$, $ThO_2$ and $BeO$. The bonding and fluxing additive in fine powder form is mixed with 90 to 99½% by weight of a basic 1:2 molar mixture of $Al_2O_3$ and $CaCO_3$ and the resulting composition well mixed. An organic vehicle, for example amyl acetate, is added to the mixture to form a thin paste and a few drops of a viscosity imparting agent, for example cellulose acetate, is added to obtain the desirable viscosity and dry adhesion. The metal parts to be joined are lightly sandblasted with carborundum grit and then cleaned. The mixture in paste form is then applied by brushing onto the sealing areas of the parts and while the composition in paste form is still wet the parts are joined together and held until air dried before being placed in a specially designed molybdenum clamping fixture to be fired.

The clamping fixture, as shown in FIG. 2, generally comprises a base support member 30 having extending therefrom fixture support rods 32. The base support member 30 additionally carries a centering plug 34, a ceramic spacer 36 is slipped over one end of the centering plug 34 and the joined together lamp placed upon the ceramic spacer. At the other end a metal plug 37 is placed on backup ring 24 to equalize the heat and a second ceramic spacer 38 placed upon the metal plug 37. A tantalum RF susceptor 40 is placed around the assembly and a pair of holding clamps 42 are placed onto support rods 32 to hold the susceptor 40 in place. A fixture head 44 is placed over the support rods and thrust against ceramic spacer 38. A pair of holding nuts 46 for the assembly are then threaded onto the upper ends of support rods 32 to secure the assembly. The base support of the fixture is then placed on a support rod 48 within an RF coil and the sealing compositions, now in dry form on the mating surfaces of the assembly, are heated in accordance with a defined firing schedule.

A firing schedule for the batch compositions, above described, is shown in FIG. 3. After the assembled discharge tube is placed in the fixture and the fixture placed in a vacuum furnace on support rod 48, the assembly is quickly heated from room temperature to approximately 700° C. in about three minutes. The furnace is then held at an average temperature of about 800° C. for twenty minutes during a degassing period. The furnace temperature is then increased from approximately 900° C. to from about 1450 to 1550° C. at a rate of about 40° C. per minute for a period of about 15 minutes. The assembly is held at a temperature from between 1450 and 1550° C. for about one minute and then cooled at a rate of about 30° C. per minute for twenty minutes. At this point with the temperature of the assembly at about 700° C. the furnace is shut down and the assembly permitted to cool to room temperature. Discharge tubes having a ⅝ inch outside diameter polycrystalline alumina body and filled with a standard mercury, sodium and argon mixture have been operated for more than 200 hours at 900 watts, or a loading of 50 watts per square centimeter, without damage to the seals. In addition, sodium filled lamps with polycrystalline alumina bodies have been operated for more than 3000 hours at 400 watts without evidence of any damage to seals when made with the above described additive compositions and fired in accordance with the above schedule.

To avoid the necessity for a long degassing period shown in the FIG. 3 schedule, an alternative mixing and firing schedule involves the fritting of the composition prior to sealing. After the blending of the batch composition for a prolonged period, the well mixed composition is placed in a recrystallized alumina crucible and melted in a gas crucible furnace at 1600 to 1650° C. until the mixture becomes molten. This molten glass is then fritted by pouring immediately into water, then ground and ball milled for from 75 to 100 hours in distilled water until the particle size of the glass is reduced to less than 400 mesh. A size of less than 200 mesh, however, is considered sufficient for purposes of producing a satisfactory sealing composition. The amyl acetate and cellulose acetate is then added as previously described and ultrasonic vibrations are used to disperse the coagulated particles and to insure a finely divided and uniformly mixed paste. The assembled lamp is then placed in the holding fixture and then placed in a vacuum furnace and fired in accordance with the firing schedule shown in FIG. 4.

The firing schedule shown in FIG. 4 requires that the assembled lamp be heated from room temperature to about 700° C. in about 3 minutes as before, then from about 700° C. to between 1425 and 1550° C. at a rate of approximately 40° C. per minute for about 20 minutes. The assembly is then held at a temperature of from 1425 to 1550° C. for a period of approximately one minute. After the hold, the assembly is cooled from the holding temperature at a rate of about 30° per minute down to 700° C. at which time the furnace is turned off and the assembly permitted to cool to room temperature.

Several alternative compositions have been found to provide excellent sealing of polycrystalline alumina tubing to end discs or caps of either ceramic, such as alumina, or metal when prepared and fired in accordance with the above-described methods. These compositions further improve the mechanical bonding strength and the vacuum sealing quality of the metal to alumina seals. One group of these compositions include the mixing of a batch composition comprising 1 mole of $CaCO_3$ and ½ mole of $Al_2O_3$ with the addition of ½ to 10% by weight of $SiO_2$ and from about ½ to 3% by weight of one or more of the materials consisting of $Ta_2O_5$, $WO_3$, $Nb_2O_5$ and $Nd_2O_3$. Another group of compositions performing equally well consist of the basic composition of $Al_2O_3$ and $CaCO_3$ with the addition of from ½ to 10% of $Y_2O_3$. This yttrium oxide composition can be further modified to improve the vacuum sealing quality and mechanical bonding strength of the composition by the addition to the composition of from about ½ to 3% of one or more of the materials $Nd_2O_3$, $Ta_2O_5$, $WO_3$, $Nb_2O_5$ and $V_2O_5$. These compositions can again be formed and fired in accordance with either of the foregoing sealing methods.

The following chart represents 28 specific examples indicated represent percent by weight of the final sealing of the ultimate constituents of various sealing compositions after sealing has been accomplished in accordance with one of the foregoing methods. The percentages composition.

| Oxide | Sealing Composition Percent | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| CaO | | | 50.7 | | | | | | | 49.0 | | | | |
| Al₂O₃ | | | 46.3 | | | | | | | 45.0 | | | | |
| SiO₂ | 3.0 | 2.5 | 2.5 | 2.5 | 2.5 | 1.0 | 3.0 | 3.0 | 3.0 | 3.0 | | | | |
| Y₂O₃ | | | | | | 2.0 | | | | | 3.0 | 3.0 | 3.0 | 3.0 |
| Nd₂O₃ | | 0.5 | | | | | | | | | | | | |
| Ta₂O₅ | | | 0.5 | | | 1.5 | 3.0 | | | 1.5 | 1.5 | 3.0 | | |
| WO₃ | | | | 0.5 | | | | 3.0 | | | | | 3.0 | |
| Nb₂O₅ | | | | | 0.5 | 1.5 | | | 3.0 | 1.5 | 1.5 | | | 3.0 |
| V₂O₅ | | | | | | | | | | | | | | |
| Total, percent | | | | | | 100 | | | | | | | | |

| Oxide | Sealing Composition Percent | | | | | | | | | | | | | |
|---|---|---|---|---|---|---|---|---|---|---|---|---|---|---|
| | 15 | 16 | 17 | 18 | 19 | 20 | 21 | 22 | 23 | 24 | 25 | 26 | 27 | 28 |
| CaO | | | 50.7 | | | | 49.0 | 49.0 | 47.2 | 45.6 | 45.6 | 47.2 | 52.0 | 52.0 |
| Al₂O₃ | | | 46.3 | | | | 45.0 | 45.0 | 42.8 | 41.4 | 41.4 | 42.8 | 47.5 | 47.5 |
| SiO₂ | | | | | | | | | 10.0 | 10.0 | | 5.0 | 0.5 | |
| Y₂O₃ | 3.0 | 2.5 | 2.5 | 2.5 | 2.5 | 2.5 | 3.0 | 3.0 | | | 10.0 | 5.0 | | 0.5 |
| Nd₂O₃ | | 0.5 | | | | | | 0.5 | | 3.0 | | | | |
| Ta₂O₅ | | | 0.5 | | | | | 0.5 | | | | | | |
| WO₃ | | | | 0.5 | | | | | | | | | | |
| Nb₂O₅ | | | | | 0.5 | | | 0.5 | | | | | | |
| V₂O₅ | | | | | | 0.5 | 3.0 | 2.0 | | | | 3.0 | | |
| Total, percent | | | | | | | | | | | | | | |

NOTE.—BaO, ZrO₂, SrO, TiO₂, BeO and ThO₂ may be substituted in whole or in part for SiO₂ or Y₂O₃ in any of the above designated compositions.

Basically then, the sealing compositions of the present invention in their final form must include from between about 44% to 55% by weight of CaO, from between about 40% to 50% by weight of Al₂O₃ and from between about 0.5 and 10% by weight of one or more materials taken from the modifying group comprising SiO₂, Y₂O₃, BaO, ZrO₂, SrO, TiO₂, BeO and ThO₂. Additionaly, in most instances, the composition will also include from between about 0.5 and 3.5% by weight, with respect to the total weight of the CaO, Al₂O₃ and the material from said modifying group, one or more materials taken from another group consisting of Nd₂O₃, Ta₂O₅, WO₃, Nb₂O₅, and V₂O₅.

Each of the various sealing composition embodiments provide for the high temperature sealing of alumina to alumina or alumina to niobium or tantalum metal in a high temperature gas discharge lamp. The sealing compositions provide good mechanical bonding strength and evidence no deleterious effects during prolonged operation from the metal vapors generally employed in this type discharge lamp. Furthermore, each of the various compositions have a temperature coefficient of expansion which matches to a substantial degree that of the niobium or tantalum metal and the polycrystalline alumina body. As will be further apparent from the foregoing, the novel compositions each include the basic constituents Al₂O₃ and CaCO₃ at nearly eutectic proportions in their batch form in addition to one or more oxide additives and employ either the frit or powdered compositions fired in accordance with their respective firing schedules to provide heretofore unrealized strength and uniformity in high temperature metal vapor lamp seals.

Since numerous changes may be made in the above described embodiments of the invention and other embodiments may be made without departing from the spirit thereof, it is intended that all matter contained in the foregoing description or shown in the accompanying drawings, shall be interpreted as illustrative and not in a limiting sense.

What is claimed is:

1. A sealing composition for bonding ceramics to ceramics or metals, which composition principally composition principally comprises from about 44 to 55% by weight of CaO, from about 40 to 50% by weight of Al₂O₃ and from about 0.5 to 10% by weight of at least one material selected from the modifying group consisting of SiO₂, BaO, ZrO₂, SrO, TiO₂, BeO, ThO₂, and Y₂O₃.

2. A sealing composition according to claim 1, wherein there is additionally included from about 0.5% to 3.5% by weight, with respect to the total weight of said CaO, Al₂O₃ and the material from said modifying group, of at least one material selected from another group consisting of Nd₂O₃, Ta₂O₅, WO₃, Nb₂O₅, and V₂O₅.

3. A sealing composition according to claim 1 wherein the material of said modifying group consists essentially of about 3% by weight of SiO₂.

4. A sealing composition according to claim 2 wherein the material of said modifying group consists essentially of about 2.5% by weight of SiO₂ and the material of said other group is present in total amount of about 0.5% by weight.

5. A sealing composition according to claim 2 wherein said material of said modifying group consists essentially of about 2.5% by weight of Y₂O₃ and the material of said other group is present in a total amount of about 0.5% by weight.

6. A sealing composition according to claim 2 wherein said material of said modifying group consists essentially of about 3% by weight of Y₂O₃ and said materials of said other group are present in a total amount of about 3% by weight.

7. The method of sealing niobium or tantalum metal members to alumina ceramic members comprising the steps of:
   (a) admixing a predetermined amount of Al₂O₃, CaCO₃ and one or more oxides taken from the group consisting of SiO₂, BaO, ZrO₂, SrO, TiO₂, BeO, ThO₂ and Y₂O₃, in a finely divided form,
   (b) adding liquid vehicle and viscosity-imparting agent to the admixture to form a paste,
   (c) applying the paste so formed on the sealing areas of the metal and ceramic members,
   (d) joining the sealing areas of the metal and ceramic members and holding together until dried,
   (e) placing the held-together metal and ceramic assembly in a vacuum furnace, and
   (f) heat treating the assembly according to a schedule which comprises:
      (1) heating from room temperature to approximately 700° C.,
      (2) degassing at an average temperature of about 800° C. for about twenty minutes,
      (3) increasing the temperature from about 900° C. to from between 1450 to 1550° at a rate of about 40° C. per minute for a period of about fifteen minutes,
      (4) holding the assembly at a temperature of from about 1450 to 1550° for about one minute, then
      (5) cooling at a rate of about 30° C. per minute for about twenty minutes, and (6) permitting the assembly to further cool until room temperature is reached.

8. The method of sealing an alumina ceramic member to a niobium or tantalum metal member comprising the steps of:
   (a) admixing a predetermined amount of $Al_2O_3$, $CaCO_3$ and one or more oxides taken from the group consisting of $SiO_2$, BaO, $ZrO_2$, SrO, $TiO_2$, BeO, $ThO_2$ and $Y_3O_2$,
   (b) melting the admixture in a furnace until it becomes molten,
   (c) pouring the molten mass immediately into water,
   (d) grinding and milling the resultant frit until the particle size is reduced to less than 200 mesh,
   (e) adding liquid vehicle and viscosity imparting agent to form a paste,
   (f) applying the paste to the sealing ends of the alumina ceramic member and niobium or tantalum member,
   (g) securing the sealing areas of the members together, and
   (h) heating in a vacuum furnace in accordance with a heating schedule which comprises:
      (1) heating the assembly from room temperature to approximately 700° C. in about three minutes, then heating from about 700° C. to from between 1425 to 1550° C. at the rate of approximately 40° C. per minute for about twenty minutes,
      (2) holding the assembly at a temperature of from between 1425 and 1550° C. for one minute,
      (3) cooling the the assembly from between 1425 and 1550° C. at a rate of about 30° per minute to approximately 700° C., and
      (4) permitting the assembly to cool from about 700° C. to room temperature.

9. A sealed discharge device comprising:
   (a) a hollow elongated ceramic envelope,
   (b) refractory metal or alumina closure members positioned proximate to each end portion of said ceramic envelope, and
   (c) a sealing composition hermetically bonding said closure members to said ceramic envelope, said sealing composition principally comprising from about 44 to 55% by weight CaO, from about 40 to 50% by weight $Al_2O_3$, and from about 0.5% to 10% by weight of at least one material selected from the modifying group consisting of BaO, $SiO_2$, $ZrO_2$, SrO, $TiO_2$, BeO, $ThO_2$ and $Y_2O_3$.

10. A sealed discharge device according to claim 9, wherein said sealing composition additionally includes from about 0.5 to 3.5% by weight, with respect to the total weight of said CaO, $Al_2O_3$ and said material from said modifying group, of at least one material selected from another group consisting of $Nd_2O_3$, $Ta_2O_5$, $WO_3$, $Nb_2O_5$ and $V_2O_5$.

References Cited

UNITED STATES PATENTS

| | | | |
|---|---|---|---|
| 2,466,508 | 4/1949 | Sun | 106—47 |
| 2,805,166 | 9/1957 | Loffler | 106—47 |
| 2,876,120 | 3/1959 | Machlan | 106—47 |
| 3,243,635 | 3/1966 | Louden et al. | 65—59 XR |
| 3,275,358 | 9/1966 | Shonebarger | 161—196 XR |
| 3,275,359 | 9/1966 | Graff | 161—196 XR |
| 3,281,309 | 10/1966 | Ross | 161—196 |
| 3,281,931 | 11/1966 | Ritz | 29—473.1 |
| 3,385,463 | 5/1968 | Lange | 220—2.3 |

EARL M. BERGERT, Primary Examiner

H. F. EPSTEIN, Assistant Examiner

U.S. Cl. X.R.

65—59; 106—47; 156—89; 161—196; 174—50.61; 287—189.365